(12) United States Patent
Akahane et al.

(10) Patent No.: US 7,922,237 B2
(45) Date of Patent: Apr. 12, 2011

(54) GUIDE-RAIL STRUCTURE OF FRONT WINDOW IN WORKING VEHICLE

(75) Inventors: Eiji Akahane, Inami-cho (JP);
Kazushige Tasaki, Kakogawa (JP);
Masayoshi Nakajima, Akashi (JP);
Tetsuji Takaoka, Akashi (JP); Teruyuki Yamada, Kakogun Inami-tyo (JP);
Tomoya Hirano, Onomichi (JP);
Yusuke Harayama, Onomichi (JP)

(73) Assignees: Catepillar Japan Ltd., Tokyo (JP);
Press Kogyo Co., Ltd., Kawasaki-shi (JP)

( * ) Notice: Subject to any disclaimer, the term of this patent is extended or adjusted under 35 U.S.C. 154(b) by 0 days.

(21) Appl. No.: 12/812,504

(22) PCT Filed: Dec. 16, 2008

(86) PCT No.: PCT/JP2008/003784
§ 371 (c)(1),
(2), (4) Date: Jul. 12, 2010

(87) PCT Pub. No.: WO2009/095972
PCT Pub. Date: Aug. 6, 2009

(65) Prior Publication Data
US 2010/0283290 A1    Nov. 11, 2010

(30) Foreign Application Priority Data
Jan. 28, 2008    (JP) ................ 2008-015983

(51) Int. Cl.
*B60J 1/12*    (2006.01)
*B60J 1/02*    (2006.01)

(52) U.S. Cl. ................. 296/190.1; 296/146.16
(58) Field of Classification Search ........... 296/190.1, 296/201, 147, 146.16; 49/197, 199, 29, 30, 49/31, 360, 361, 506
See application file for complete search history.

(56) References Cited

U.S. PATENT DOCUMENTS

| | | | | |
|---|---|---|---|---|
| 3,078,917 A | * | 2/1963 | Recchione | 160/120 |
| 3,385,459 A | * | 5/1968 | Wellman, Jr. | 414/498 |
| 4,775,180 A | * | 10/1988 | Phillips | 160/84.04 |
| 4,889,381 A | * | 12/1989 | Tamblyn et al. | 296/98 |
| 5,044,686 A | * | 9/1991 | Acenbrack | 296/97.7 |
| 5,154,468 A | * | 10/1992 | Teigen et al. | 296/186.4 |

(Continued)

FOREIGN PATENT DOCUMENTS
JP    A-5-4516    1/1993
(Continued)

OTHER PUBLICATIONS
International Search Report dated Mar. 24, 2009 in International Application No. PCT/JP2008/003784.

*Primary Examiner* — Lori L Lyjak
(74) *Attorney, Agent, or Firm* — Oliff & Berridge, PLC

(57) ABSTRACT

A vehicle includes a cab; a front window that is capable of moving between a closed position where a window opening at a front surface of the cab is closed and an open position where the front window is housed in a ceiling portion of the cab and the window opening is open; and a guide structure for the front window that guides the front window between the closed position and the open position.

15 Claims, 8 Drawing Sheets

U.S. PATENT DOCUMENTS

| | | | | |
|---|---|---|---|---|
| 5,330,246 | A | * | 7/1994 | Bernardo ........................ 296/98 |
| 5,547,214 | A | * | 8/1996 | Zimmerman et al. ..... 280/730.1 |
| 5,640,072 | A | * | 6/1997 | Miyazaki et al. ............. 318/282 |
| 5,802,766 | A | * | 9/1998 | Miyazaki et al. ................. 49/29 |
| 6,991,283 | B2 | * | 1/2006 | Akahane et al. ......... 296/190.08 |

FOREIGN PATENT DOCUMENTS

| | | |
|---|---|---|
| JP | U-6-87462 | 12/1994 |
| JP | A-7-279200 | 10/1995 |
| JP | A-2000-274135 | 10/2000 |
| JP | A-2002-327571 | 11/2002 |

* cited by examiner

GUIDE-RAIL STRUCTURE OF FRONT WINDOW IN WORKING VEHICLE

CROSS-REFERENCE TO RELATED APPLICATIONS

This application is the U.S. National Phase of PCT/JP2008/003784, filed Dec. 16, 2008, which claims priority from Japanese Patent Application No. 2008-015983 filed Jan. 28, 2008, the entire disclosure of which is incorporated herein by reference hereto.

BACKGROUND

The present disclosure relates to a guide rail structure for a front window in a working vehicle such as a hydraulic shovel.

Generally, some front windows to be provided in a cab of a working vehicle such as a hydraulic shovel are structured to move between a closed position where a window opening at a cab front surface is closed and an open position where the front window is housed in a cab ceiling portion and the window opening is open. Some of the front windows are structured to wind base end sides of assist cables, whose tip end sides are joined to lower portions of the front window, using winders disposed on cab rear portions in order to assist an operator when opening and closing the front window.

In such a front window, guide rails that guide an opening and closing movement of the front window are disposed in inverted L shapes from the cab front surface to the ceiling surface. A conventional guide rail uses a roller guide portion for guiding an upper roller and a lower roller attached to the upper and lower portions of the front window and a cable guide portion for guiding the assist cable that are juxtaposed (for example, refer to Japanese Published Unexamined Patent Application No. 2002-327571 and Japanese Published Unexamined Patent Application No. 2000-274135).

When a cab having, for example, a substantially rectangular parallelepiped shape is provided with guide rails including the roller guide portions and the cable guide portions which are juxtaposed, if the radius of curvature of the guide rail corner portion to be disposed at the corner between the cab front surface and cab ceiling surface is great, the guide rail corner portion projects to the indoor side and reduces the cab interior space or obstructs the field of view of an operator. There is thus a demand to minimize the radius of curvature of the guide rail corner portion. However, if the radius of curvature of the cable guide portion is small at the guide rail corner portion, the frictional force that occurs when the assist cable moves while being pressed against the groove inner side surface increases, and the assist cable and the guide rail are worn out early.

On the other hand, to prevent rainwater from entering the gaps between the front window and the window opening when the front window is at the closed position, a sealing member is fitted to the peripheral edge portion of the front window opening. However, excellent sealing performance cannot be secured unless the front window can be pressed perpendicularly to the sealing member when the front window is closed.

Therefore, in Japanese Published Unexamined Patent Application No. 2002-327571, by providing a sliding member with wear resistance and lubricity or disposing a cable guide roller on the cable guide portion at the guide rail corner portion, the friction which occurs between the assist cable and the guide rail at the guide rail corner portion can be reduced. On the other hand, in Japanese Published Unexamined Patent Application No. 2000-274135, to secure sealing performance between the front window and the sealing member, a device for pressing the front window perpendicular to the sealing member is proposed.

SUMMARY

However, in Japanese Published Unexamined Patent Application No. 2002-327571 described above, when a sliding member is used, a special guide rail into which the sliding member is embedded is necessary. This increases the cost and is not universal. In addition, if a cable guide roller with a large size corresponding to the radius of curvature of the corner portion is adopted, the cable guide roller greatly projects to the indoor side and becomes an obstacle. As a result, adopting many small cable guide rollers is more preferable. However, in this case, the number of components increases and the cable guide roller attaching operation becomes troublesome, and the cost is also increased.

On the other hand, in Japanese Published Unexamined Patent Application No. 2000-274135, as a device for pressing the front window perpendicular to the sealing member, many parts such as a lever, a spring, a stopper, and a stopper releasing member, etc., are necessary. The structure thus becomes complicated and increases the cost.

A first aspect of the present disclosure provides a vehicle that includes a cab; a front window that is capable of moving between a closed position where a window opening at a front surface of the cab is closed and an open position where the front window is housed in a ceiling portion of the cab and the window opening is open; and a guide structure for the front window that guides the front window between the closed position and the open position. The guide structure for the front window includes an upper roller and a lower roller that are attached to an upper portion and a lower portion of the front window; an assist cable having a tip end side joined to a lower portion of the front window and a base end side joined to a winder disposed at a rear portion of the cab: and a guide rail. The guide rail includes: a front guide rail disposed along the cab front surface, the front guide rail configured so that a cable guide portion that guides the assist cable is positioned at a front side and a front roller guide portion that guides the lower roller is positioned at a rear side relative to the cable guide portion at the front guide rail, an upper guide rail disposed along a ceiling surface of the cab, the upper guide rail configured so that an upper roller guide portion that guides the upper roller is positioned at an upper side and the cable guide portion is positioned at a lower side relative to the upper roller guide portion at the upper guide rail, a front portion of the upper roller guide portion being extended linearly further toward a front side of the cab than the cable guide portion at the upper guide rail, and a corner guide rail disposed at a corner portion between the front guide rail and the upper guide rail, the corner guide rail configured so that a rounded roller guide portion is joined to an upper end of the front roller guide portion and guides the lower roller and so that the cable guide portion is provided on an outer diameter side of the rounded roller guide portion at the corner guide rail.

According to the first aspect of the invention, the corner guide rail has a cable guide portion formed on the outer diameter side of the roller guide portion, and therefore, even when the radius of curvature of the inner diameter side of the corner guide rail is designed to be small so as to correspond to the cab having, for example, a rectangular parallelepiped shape, a large radius of curvature of the cable guide portion can be secured, and the frictional force occurring between the assist cable and the cable guide portion can be reduced.

Therefore, the assist cable and the guide rail can be effectively prevented from being worn out early by the frictional force. Further, when the front window reaches the closed position, by guiding the upper roller toward the cab front surface by the extended portion of the roller guide portion of the upper guide rail, the front window can be pressed substantially perpendicularly to the sealing member for preventing entrance of rainwater fitted to the peripheral edge portion of the window opening. Accordingly, the sealing performance between the front window and the sealing member can be reliably secured. As a result, while the assist cable and the guide rail can be effectively protected by reducing the frictional force occurring between the assist cable and the cable guide portion, the sealing performance between the front window and the sealing member can be secured, and this structure does not need special guide rails and extra members and is simple, and can greatly contribute to cost reduction.

BRIEF DESCRIPTION OF THE DRAWINGS

Various embodiments of the disclosure will be described with reference to the drawings, wherein.

DETAILED DESCRIPTION OF EMBODIMENTS

Figure 1:
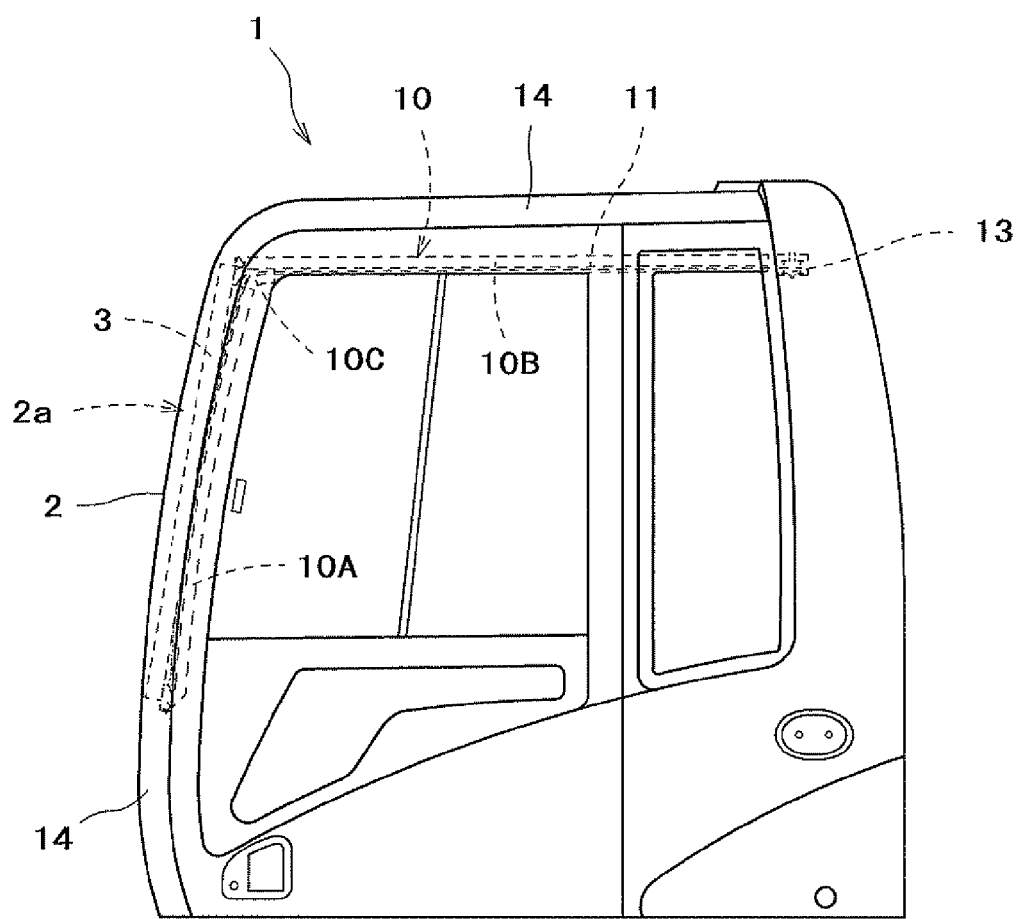
FIG. 1 is a side view of a cab.
Figure 2:
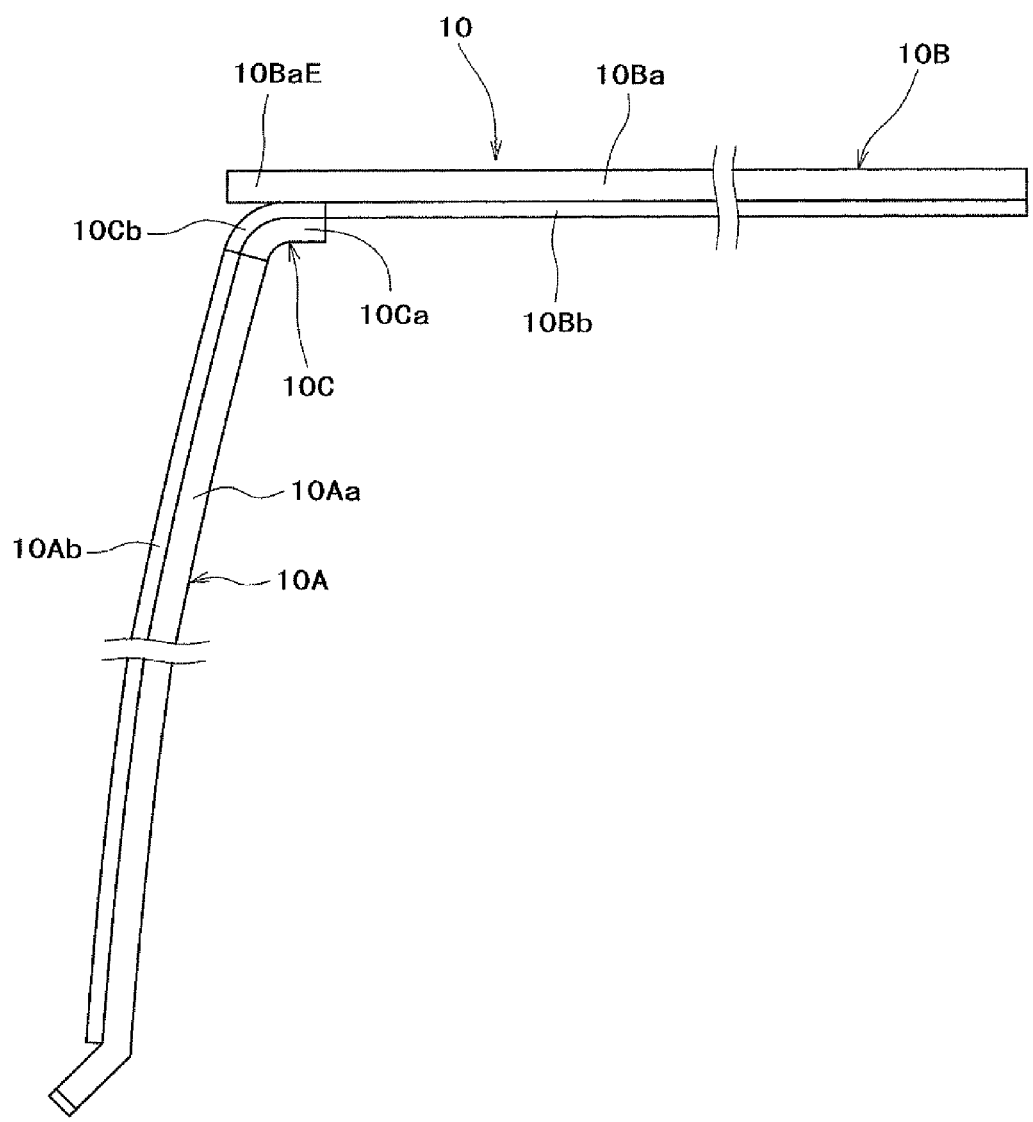
FIG. 2 is a view showing a guide rail.

Next, an embodiment of the present disclosure will be described with reference to the drawings. In the drawings, reference numeral 1 denotes a cab provided in a working machine such as a hydraulic shovel. The cab 1 has a rectangular parallelepiped shape in the present embodiment, and a window opening 2a is opened at the front surface 2 of the cab 1. Reference numeral 3 denotes a front window for opening and closing the window opening 2a, and the front window 3 is configured by fitting a transparent plate 3b such as a glass plate to upper, lower, left, and right window frames 3a, and to the upper and lower portions of the left and right window frames 3a, a pair of upper left and right rollers 4 and a pair of lower left and right rollers 5 are attached rotatably via brackets 6 and 7 and pivots 8 and 9, respectively. By guiding the upper rollers 4 and lower rollers 5 by a pair of left and right guide rails 10 described later, the front window 3 moves to a closed position at which the window opening 2a is closed and an open position at which the front window 3 is housed in a ceiling portion of the cab 1 and the window opening 2a is opened. The front window 3 is locked at each of the closed position and the open position by a locking device not shown. A handle to be gripped by an operator to open or close the front window 3 is attached to the window frame although this is not shown.

On the other hand, reference numeral 11 denotes an assist cable, and the tip end side of the assist cable 11 is joined to the lower portion of the front window 3 via a link 12, which is axially supported swingably by the pivot 9 supporting the lower roller 5. On the other hand, the base end side of the assist cable 11 reaches the ceiling rear portion of the cab 1 while being guided by the guide rail 10, and is joined to a winder 13 disposed on the ceiling rear portion, and a winding spring (not shown) which always urges the assist cable 11 to the winding side is installed inside the winder 13. When the urging force of the winding spring is applied to the front window 3 via the assist cable 11, the effort of an operator when opening or closing the front window 3 can be reduced. As the winder 13, which winds the assist cable 11, a spring type is adopted in the present embodiment as described above, however, without limiting to this, an electric drive type which is driven by a motor is also usable.

The guide rails 10 are fixed to left and right frames 14 forming a framework structure of the cab 1 directly or via plates 15, guide the upper rollers 4 and the lower rollers 5, and guide the assist cables 11. The guide rail 10 is formed by a front guide rail 10A directed in the up-down direction and disposed along the front surface 2 of the cab 1, an upper guide rail 10B directed in the front-rear direction and disposed along the ceiling surface 16 of the cab 1, and a rounded corner guide rail 10C which is disposed at the corner between the front surface 2 and the ceiling surface 16 of the cab 1.

The front guide rail 10A, upper guide rail 10B, and corner guide rail 10C are formed so that roller guide portions 10Aa, 10Ba, and 10Ca having U-shaped sectional shapes for guiding the lower roller 5 or the upper roller 4 and cable guide portions 10Ab, 10Bb, and 10Cb having U-shaped sectional shapes for guiding the assist cable 11 are juxtaposed, and the front guide rail 10A is disposed so that the cable guide portion 10Ab is positioned at the front side and the roller guide portion 10Aa is positioned at the rear side, and the lower roller 5 is guided by the roller guide portion 10Aa of the front guide rail 10A.

The upper guide rail 10B is disposed so that the roller guide portion 10Ba is positioned at the upper side and the cable guide portion 10Bb is positioned at the lower side, and the upper roller 4 is guided by the roller guide portion 10Ba of the upper guide rail 10B. Further, the front portion of the roller guide portion 10Ba of the upper guide rail 10B is extended linearly further toward the cab front surface 2 than the front end of the cable guide portion 10Bb, and the extended portion 10BaE can guide the upper roller 4 linearly toward the cab front surface 2. By guiding the upper roller 4 linearly toward the cab front surface 2, the front window 3 can be pressed substantially perpendicularly to the sealing member 17 for preventing entrance of rainwater fitted to the peripheral edge portion of the window opening 2a.

On the other hand, the corner guide rail 10C has a rounded roller guide portion 10Ca to be joined to the upper end of the roller guide portion 10Aa of the front guide rail 10A, and by the roller guide portion 10Ca, the lower roller 5 can be guided to the ceiling front portion of the cab 1. The cable guide portion 10Cb of the corner guide rail 10C is formed on the outer diameter side of the roller guide portion 10Ca, and the cable guide portion 10Cb is formed so as to join roundly the upper end of the cable guide portion 10Ab of the front guide rail 10A and the front end of the cable guide portion 10Bb of the upper guide rail 10B.

Here, as described above, the cable guide portion 10Ab of the front guide rail 10A is positioned at the front side of the roller guide portion 10Aa, the cable guide portion 10Bb of the upper guide rail 10B is positioned at the lower side of the roller guide portion 10Ba, and the cable guide portion 10Cb of the corner guide rail 10C is formed to join roundly the upper end of the cable guide portion 10Ab of the front guide rail 10A and the front end of the cable guide portion 10Bb of the upper guide rail 10B. The cable guide portion 10Cb of the corner guide rail 10C is positioned at the outer diameter side of the roller guide portion 10Ca, so that even when the radius of curvature of the inner diameter side of the corner guide rail 10C is designed to be small so as to correspond to the substantially rectangular parallelepiped cab 1, the radius of curvature of the cable guide portion 10Cb can be made large. Further, the roller guide portion 10Ba of the upper guide rail 10B is positioned at the upper side of the cable guide portion 10Bb, so that without being obstructed by the cable guide portion 10Bb, the front portion of the roller guide portion 10Ba of the upper guide rail 10B can be extended linearly further toward the cab front surface 2 than the front end of the cable guide portion 10Bb as described above.

Figure 3:
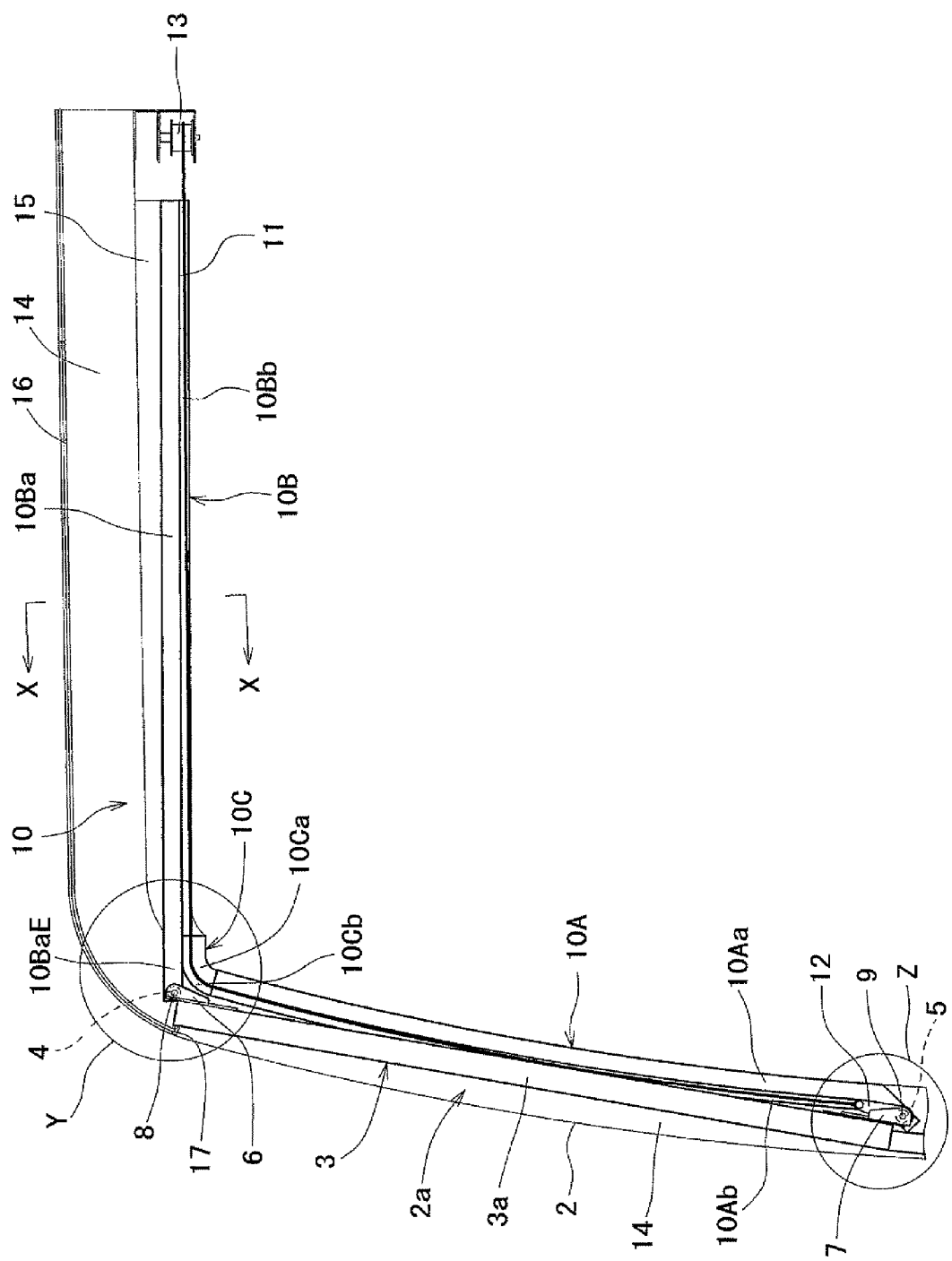
FIG. 3 is a view showing a state where a front window is at a closed position.

In the state where the front window 3 is at the closed position, as shown in FIG. 3, while the upper roller 4 is positioned at the front end portion of the roller guide portion 10Ba of the upper guide rail 10B, the lower roller 5 is positioned at the lower end portion of the roller guide portion 10Aa of the front guide rail 10A. The assist cable 11 is wired so as to reach the winder 13 disposed at the ceiling rear portion of the cab 1 from the lower portion of the front window 3 through the cable guide portion 10Ab of the front guide rail 10A, the cable guide portion 10Cb of the corner guide rail 10C, and the cable guide portion 10Bb of the upper guide rail 10B.

When the front window 3 at the closed position is opened, while the upper roller 4 moves rearward by being guided by the roller guide portion 10Ba of the upper guide rail 10B, the lower roller 5 moves upward by being guided by the roller guide portion 10Aa of the front guide rail 10A, and further reaches the roller guide portion 10Ca of the corner guide rail 10C. When moving the front window 3 to the opening side, the assist cable 11 is urged to the winding side by the winding spring installed inside the winder 13, and an effort of an operator is reduced.

Figure 4:
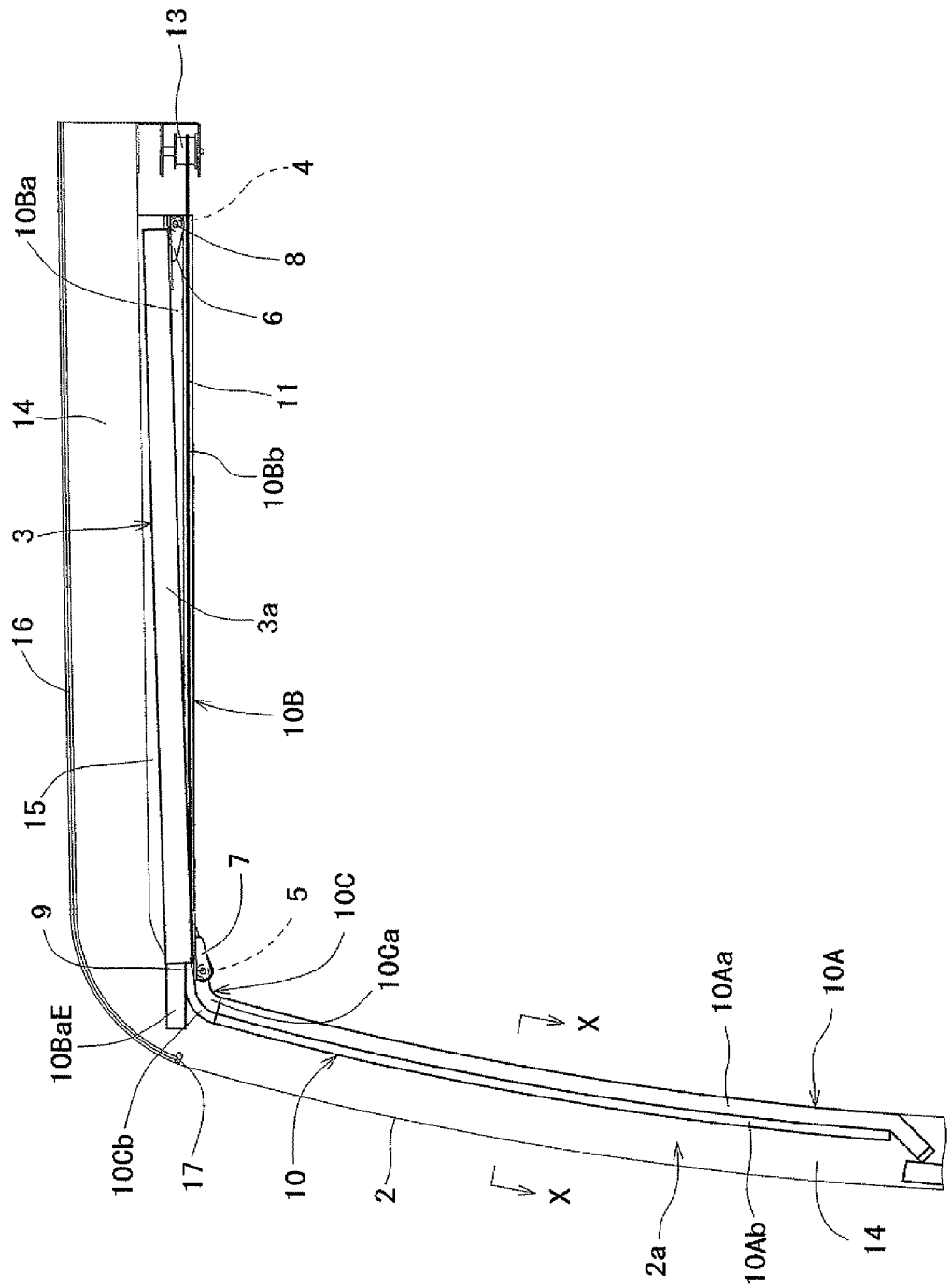
FIG. 4 is a view showing a state where the front window is at an open position.
Figure 5A:
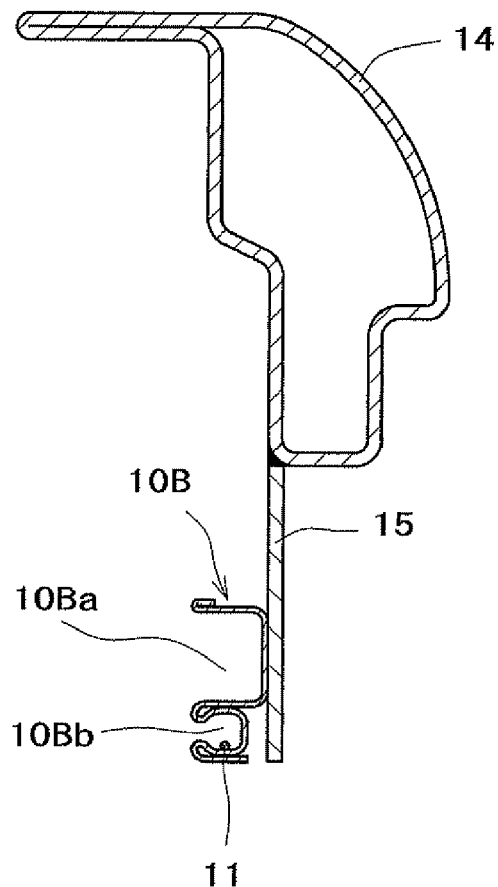
FIG. 5A is a sectional view along X-X or FIG. 3.
Figure 5B:
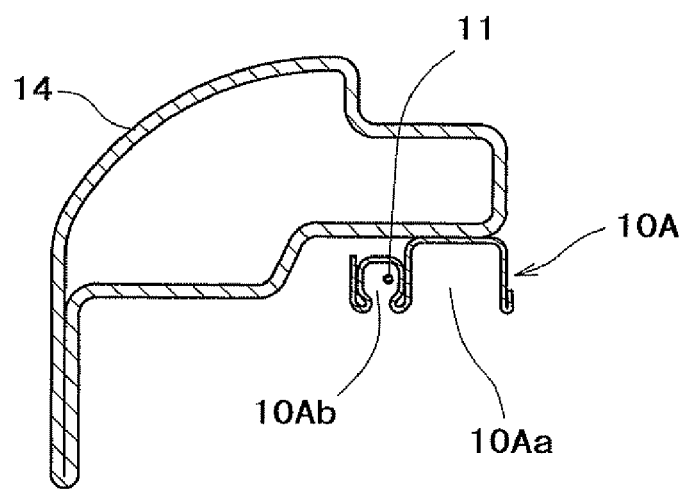
FIG. 5B is a sectional view along X-X of FIG. 4.
Figure 6:
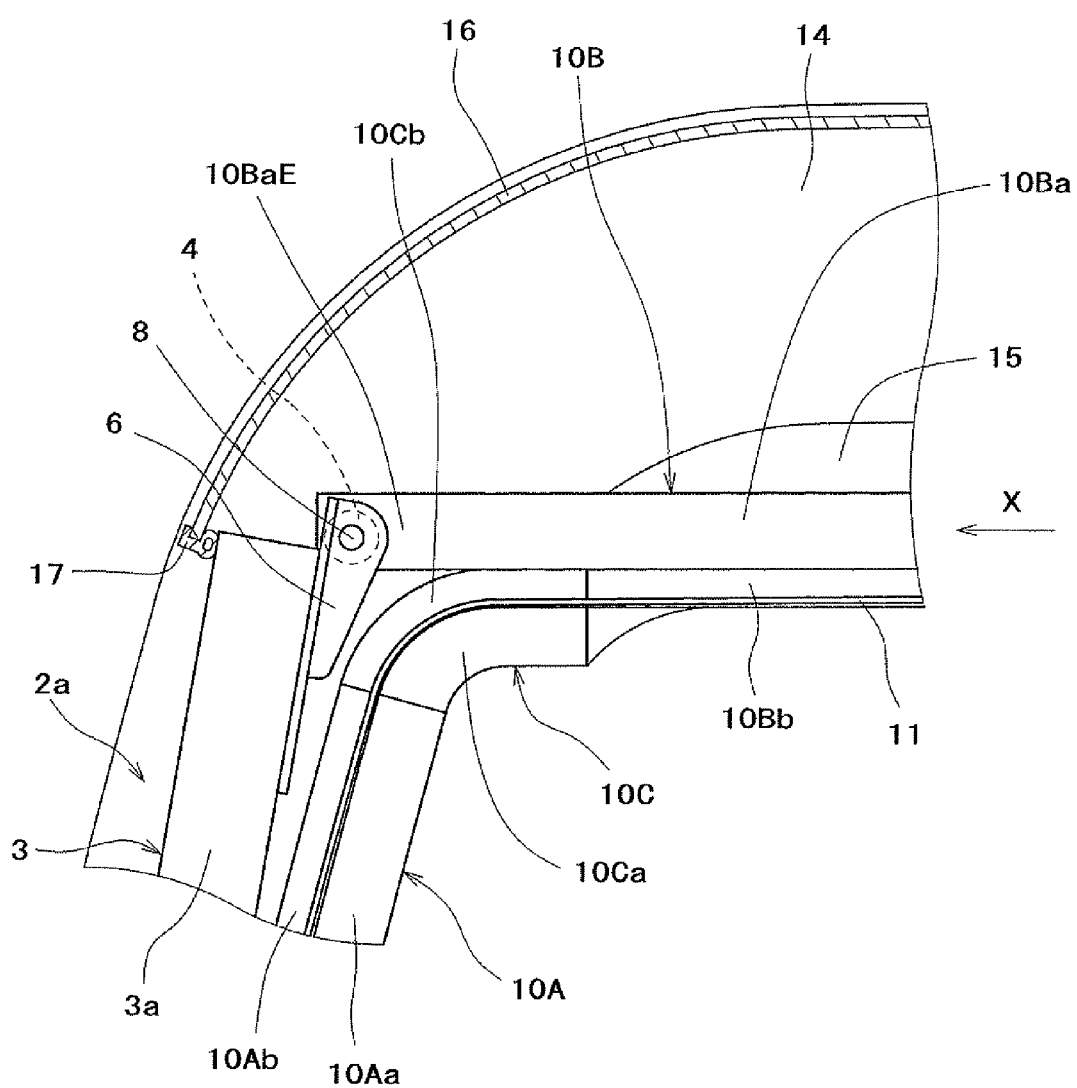
FIG. 6 is an enlarged view of the area Y in FIG. 3.
Figure 7:
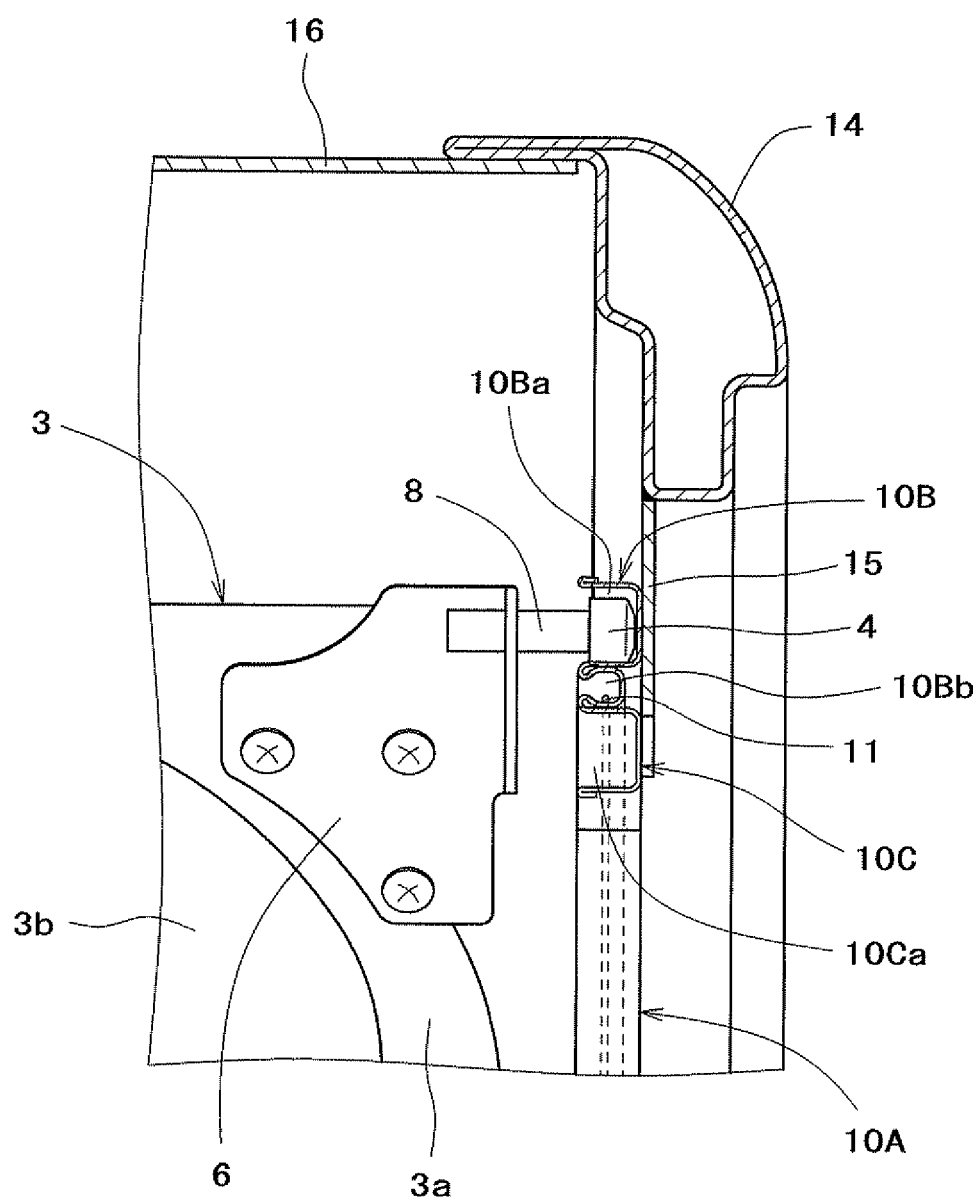
FIG. 7 is a view on the arrow X in FIG. 6.
Figure 8A:
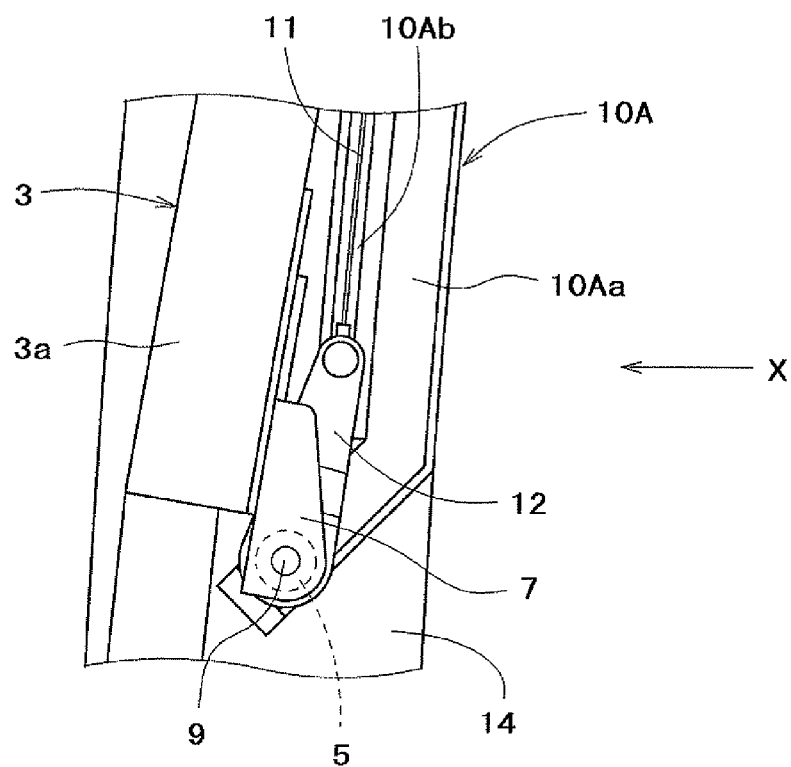
FIG. 8A is an enlarged view of the area Z in FIG. 3.
Figure 8B:
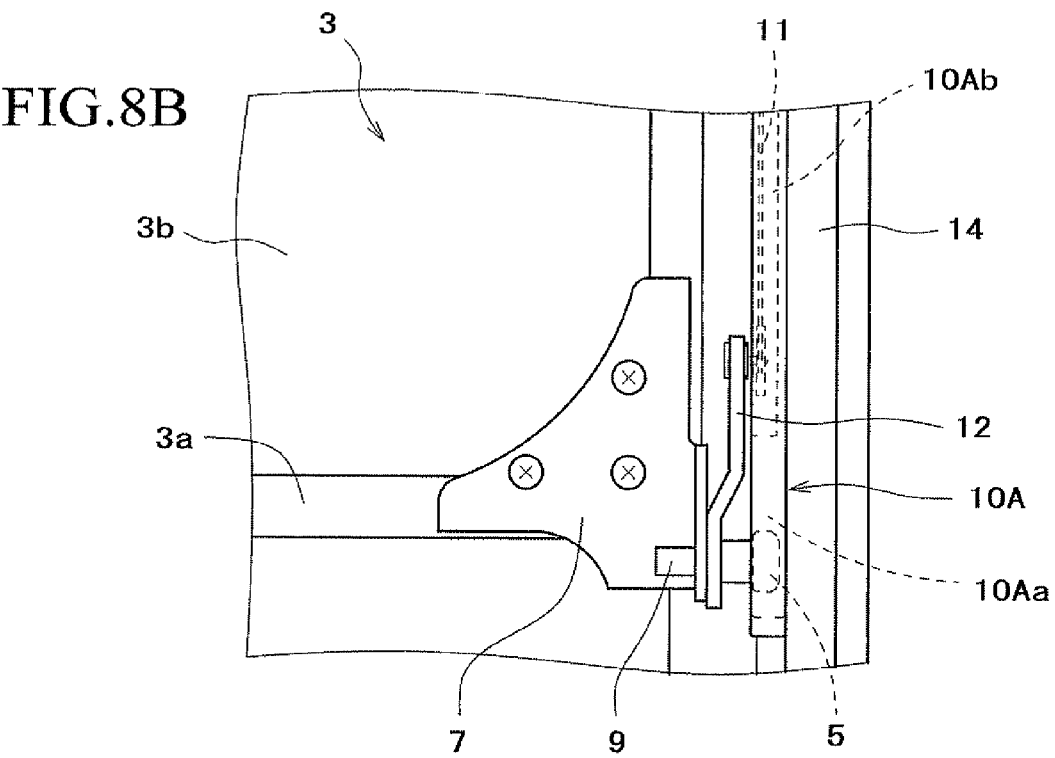
FIG. 8B is a view of the area X in FIG. 8A.

Further, in the state where the front window 3 reaches the open position, as shown in FIG. 4, while the upper roller 4 is positioned at the rear end portion of the roller guide portion 10Ba of the upper guide rail 10B, the lower roller 5 is positioned at the rear end portion of the roller guide portion 10Ca of the corner guide rail 10C.

On the other hand, when the front window 3 at the open position is closed, while the upper roller 4 moves forward by being guided by the roller guide portion 10Ba of the upper guide rail 10B, the lower roller 5 moves downward by being guided by the roller guide portion 10Ca of the corner guide rail 10C and the roller guide portion 10Aa of the front guide rail 10A. In this case, the front portion of the roller guide portion 10Ba of the upper guide rail 10B is extended linearly further toward the cab front surface 2 than the front end of the cable guide portion 10Bb, so that by guiding the upper roller 4 linearly toward the cab front surface 2 by the extended portion 10BaE, the front window 3 is pressed substantially perpendicularly to the sealing member 17 for preventing entrance of rainwater fitted to the peripheral edge portion of the window opening 2a when the front window 3 reaches the closed position. When moving the front window 3 to the closing side, the assist cable 11 is urged to the winding side by the winding spring installed inside the winder 13, so that the descending speed of the front window 3 according to its own weight is reduced, and accordingly, the effort of the operator can be reduced.

In the present embodiment configured as described above, the guide rail 10 guides the upper roller 4 and the lower roller 5 attached to the upper and lower portions of the front window 3 and the assist cable 11 joined to the lower portion of the front window 3 to reduce the effort necessary for opening and closing the front window 3, and the guide rail 10 is formed by the front guide rail 10A disposed along the cab front surface 2, the upper guide rail 10B disposed along the cab ceiling surface 16, and the corner guide rail 10C disposed at the corner portion between the cab front surface 2 and the cab ceiling surface 16. The front guide rail 10A is configured so that the cable guide portion 10Ab is positioned at the front side and the roller guide portion 10Aa is positioned at the rear side, and the lower roller 5 is guided by the roller guide portion 10Aa of the front guide rail 10A. The upper guide rail 10B is configured so that the roller guide portion 10Ba is positioned at the upper side and the cable guide portion 10Bb is positioned at the lower side, the front portion of the roller guide portion 10Ba is extended linearly further toward the cab front surface 2 than the cable guide portion 10Bb, and the upper roller 4 is guided by the roller guide portion 10Ba of the upper guide rail 10B. The corner guide rail 10C includes a rounded roller guide portion 10Ca which is joined to the upper end of the roller guide portion 10Aa of the front guide rail 10A and guides the lower roller 5 to the cab ceiling front portion, and a cable guide portion 10Cb which is formed on the outer diameter side of the roller guide portion 10Ca and joins roundly the upper end of the cable guide portion 10Ab of the front guide rail 10A and the front end of the cable guide portion 10Bb of the upper guide rail 10B.

Then, the assist cable 11 is wired so as to reach the winder 13 disposed at the ceiling rear portion of the cab 1 from the lower portion of the front window 3 through the cable guide portion 10Ab of the front guide rail 10A, the cable guide portion 10Cb of the corner guide rail 10C, and the cable guide portion 10Bb of the upper guide rail 10B. When opening or closing the front window 3, the assist cable 11 moves while being pressed against the groove inner side surface of the cable guide portion 10Cb of the corner guide rail 10C due to the tension of the assist cable. In this case, the corner guide rail 10C has the cable guide portion 10Cb formed on the outer diameter side of the roller guide portion 10Ca, so that even when the inner diameter side of the corner guide rail 10C, that is, the radius of curvature of the roller guide portion 10Ca is designed to be small so as to correspond to the cab 1 having, for example, a rectangular parallelepiped shape, a large radius of curvature of the cable guide portion 10Cb can be secured, and the frictional force occurring between the assist cable 11 and the cable guide portion 10Cb can be reduced. Accordingly, the assist cable 11 and the guide rail 10 can be effectively prevented from being worn out early by the frictional force.

In this configuration, in the upper guide rail 10B, the front portion of the roller guide portion 10Ba is extended linearly further toward the cab front surface 2 than the cable guide portion 10Bb. In this case, the upper guide rail 10B has the roller guide portion 10Ba provided on the upper side of the cable guide portion 10Bb, so that the roller guide portion 10Ba can be extended linearly toward the cab front surface 2 without being obstructed by the cable guide portion 10Bb. By guiding the upper roller 4 linearly toward the cab front surface 2 by the extended portion 10BaE of the roller guide portion 10Ba, the front window 3 is pressed substantially perpendicularly to the sealing member 17 for preventing entrance of rainwater fitted to the peripheral edge portion of the window opening 2a when the front window reaches the closed position. Therefore, the sealing performance between the front window 3 and the sealing member 17 can be reliably secured, and the problem of early wear of the sealing member 17 by friction with the front window 3 can be avoided.

As a result, while the frictional force occurring between the assist cable 11 and the cable guide portion 10Cb can be reduced by increasing the radius of curvature of the cable guide portion 10Cb of the corner guide rail 10C, the sealing performance between the front window 3 and the sealing member 17 can be secured. Further, this configuration is simple and does not need special guide rails and extra members, and can greatly contribute to cost reduction.

The present disclosure relates to the technical field of a guide rail structure of a front window in a working vehicle such as a hydraulic shovel. With the configuration of the present invention, the frictional force at the corner portion can be reduced, so that the assist cable and the guide rail can be effectively prevented from being worn out early by the frictional force. Further, the present disclosure does not need special guide rails and extra members, and can secure the sealing performance between the front window and the sealing member by a simple structure when closing the front window, so that the present disclosure can greatly contribute to cost reduction.

What is claimed is:

1. A vehicle comprising:
    a cab;
    a front window that is capable of moving between a closed position where a window opening at a front surface of the cab is closed and an open position where the front window is housed in a ceiling portion of the cab and the window opening is open; and
    a guide structure for the front window that guides the front window between the closed position and the open position, the guide structure for the front window comprising:
        an upper roller and a lower roller that are attached to an upper portion and a lower portion of the front window;
        an assist cable having a tip end side joined to a lower portion of the front window and a base end side joined to a winder disposed at a rear portion of the cab: and
        a guide rail that includes:
            a front guide rail disposed along the cab front surface, the front guide rail configured so that a cable guide portion that guides the assist cable is positioned at a front side and a front roller guide portion that guides the lower roller is positioned at a rear side relative to the cable guide portion at the front guide rail,
            an upper guide rail disposed along a ceiling surface of the cab, the upper guide rail configured so that an upper roller guide portion that guides the upper roller is positioned at an upper side and the cable guide portion is positioned at a lower side relative to the upper roller guide portion at the upper guide rail, a front portion of the upper roller guide portion being extended linearly further toward a front side of the cab than the cable guide portion at the upper guide rail, and
            a corner guide rail disposed at a corner portion between the front guide rail and the upper guide rail, the corner guide rail configured so that a rounded roller guide portion is joined to an upper end of the front roller guide portion and guides the lower roller and so that the cable guide portion is provided on an outer diameter side of the rounded roller guide portion at the corner guide rail.

2. The vehicle according to claim 1, wherein the cable guide portion extends from a lower end of the front guide rail through the corner guide rail to a rear end of the upper guide rail.

3. The vehicle according to claim 1, wherein the cable guide portion is juxtaposed with the front roller guide portion, the upper roller guide portion and the rounded roller guide portion.

4. The vehicle according to claim 1, wherein the cable guide portion includes a front cable guide portion at the front guide rail, a upper cable guide portion at the upper guide rail, and a rounded cable guide portion at the corner guide rail.

5. A guide structure, comprising:
    an upper roller and a lower roller;
    an assist cable having a tip end side and a base end side joined to a winder; and
    a guide rail that includes:
        a front guide rail configured so that a cable guide portion that guides the assist cable is positioned at a front side and a front roller guide portion that guides the lower roller is positioned at a rear side relative to the cable guide portion at the front guide rail,
        an upper guide rail configured so that an upper roller guide portion that guides the upper roller is positioned at an upper side and the cable guide portion is positioned at a lower side relative to the upper roller guide portion at the upper guide rail, a front portion of the upper roller guide portion being extended linearly further toward a front side than the cable guide portion at the upper guide rail, and
        a corner guide rail disposed at a corner portion between the front guide rail and the upper guide rail, the corner guide rail configured so that a rounded roller guide portion is joined to an upper end of the front roller guide portion and guides the lower roller and so that the cable guide portion is provided on an outer diameter side of the rounded roller guide portion at the corner guide rail.

6. The guide structure according to claim 5, wherein the cable guide portion extends from a lower end of the front guide rail through the corner guide rail to a rear end of the upper guide rail.

7. The guide structure according to claim 5, wherein the cable guide portion is juxtaposed with the front roller guide portion, the upper roller guide portion and the rounded roller guide portion.

8. The guide structure according to claim 5, wherein the cable guide portion includes a front cable guide portion at the front guide rail, a upper cable guide portion at the upper guide rail, and a rounded cable guide portion at the corner guide rail.

9. A vehicle comprising the guide structure according to claim 5.

10. A guide structure, comprising:
    an upper roller and a lower roller;
    an assist cable having a tip end side and a base end side joined to a winder; and
    a guide rail that includes:
        a front guide rail configured so that a cable guide portion that guides the assist cable is positioned at a front side and a roller guide portion that guides the upper roller and the lower roller is positioned at a rear side relative to the cable guide portion at the front guide rail,
        an upper guide rail configured so that the roller guide portion is positioned at an upper side and the cable guide portion is positioned at a lower side relative to the roller guide portion at the upper guide rail, a front portion of the roller guide portion being extended linearly further toward a front side than the cable guide portion at the upper guide rail, and
        a corner guide rail disposed at a corner portion between the front guide rail and the upper guide rail, the corner guide rail configured so that the cable guide portion is provided on an outer diameter side of the roller guide portion at the corner guide rail.

11. The guide structure according to claim 10, wherein the cable guide portion extends from a lower end of the front guide rail through the corner guide rail to a rear end of the upper guide rail.

12. The guide structure according to claim 10, wherein the cable guide portion includes a front cable guide portion at the front guide rail, an upper cable guide portion at the upper guide rail, and a rounded cable guide portion at the corner guide rail.

13. The guide structure according to claim 10, wherein the cable guide portion is juxtaposed with the roller guide portion.

14. The guide structure according to claim 10, wherein:
the roller guide portion includes a front roller guide portion at the front guide rail, an upper roller guide portion at the upper guide rail, and a rounded roller guide portion at the corner guide rail, and the front roller guide portion and the rounded roller guide portion guide the lower roller and the upper roller guide portion guides the upper roller.

15. A vehicle comprising the guide structure according to claim 10.

* * * * *